Oct. 8, 1963   W. M. CHAMBERS   3,106,275
SPRING ENGAGED CLUTCH
Filed Aug. 29, 1960   2 Sheets-Sheet 2
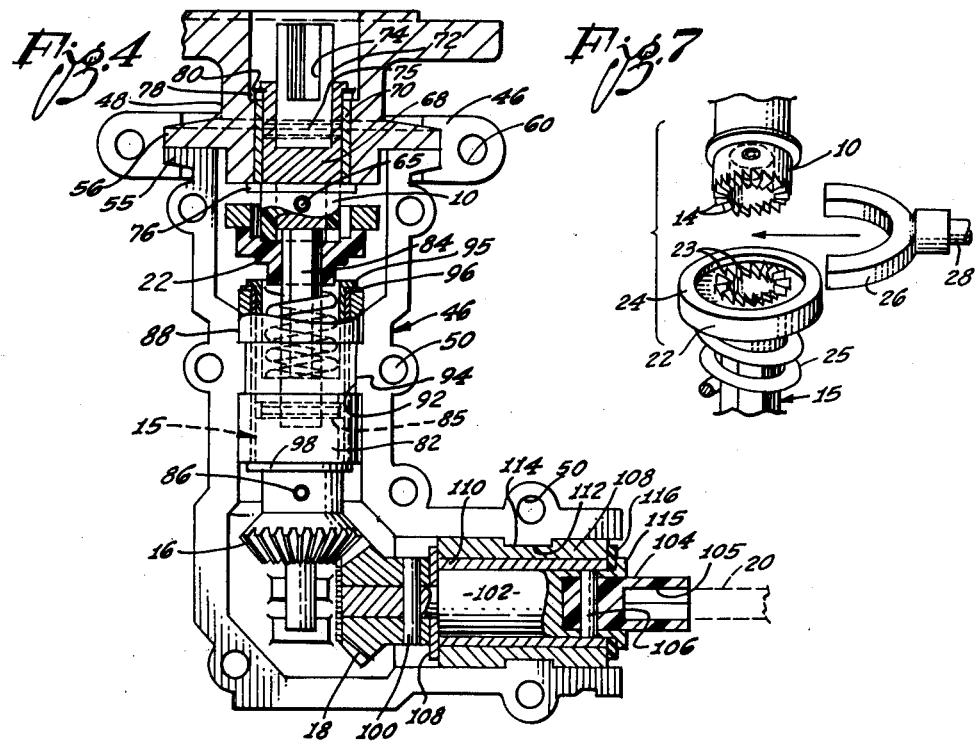
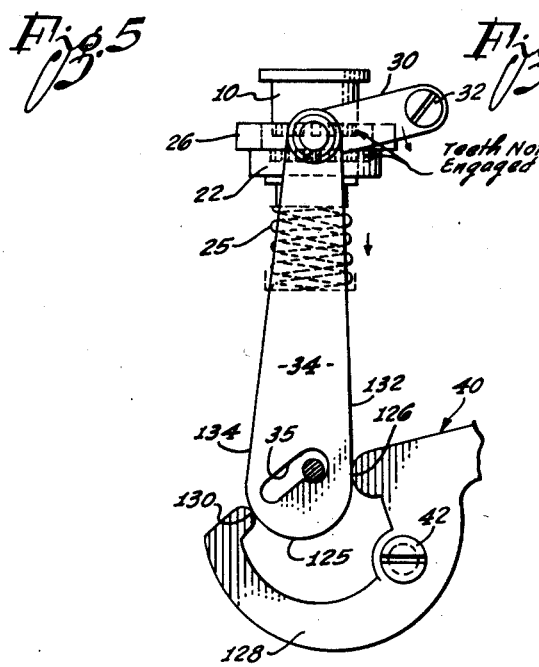
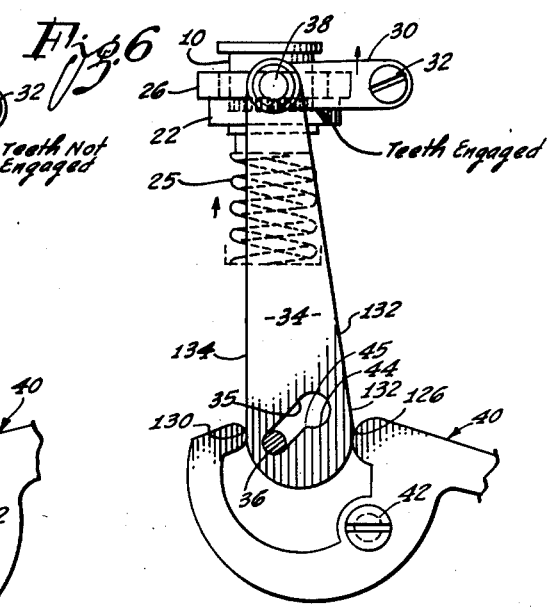
INVENTOR:
William M. Chambers
By Smyth, Roston & Pavitt
Attorneys.

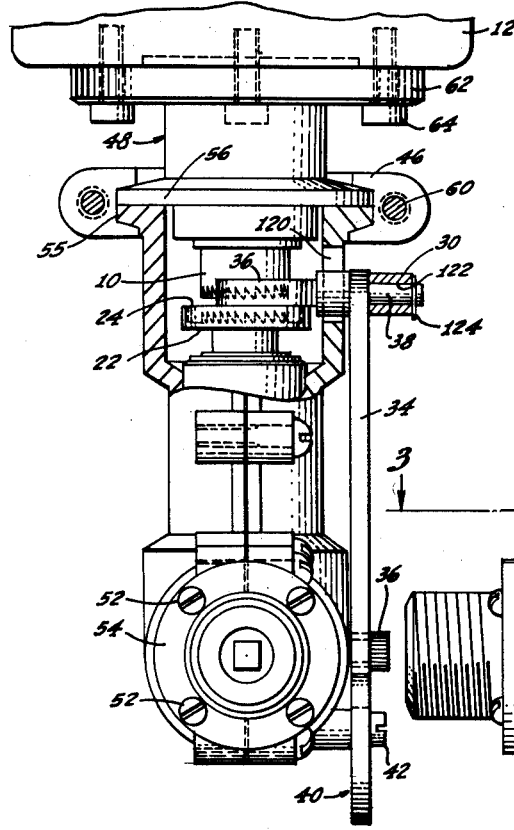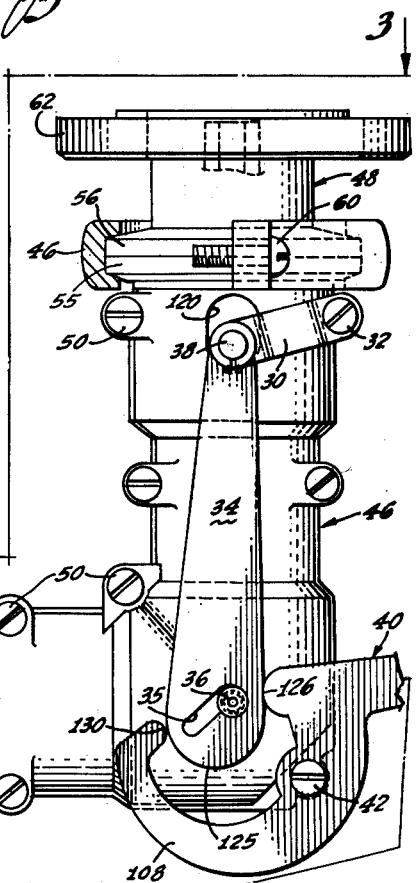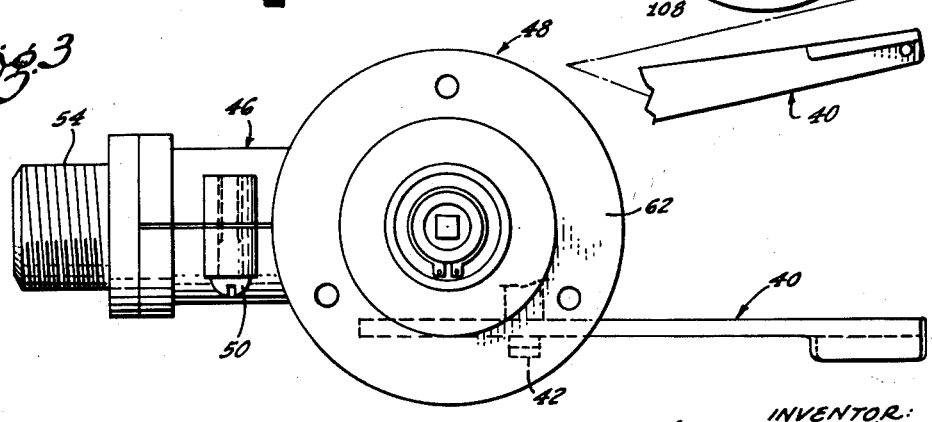

3,106,275
SPRING ENGAGED CLUTCH
William M. Chambers, Los Angeles, Calif., assignor to Electro-Way Corporation, Los Angeles, Calif., a corporation of California
Filed Aug. 29, 1960, Ser. No. 52,464
4 Claims. (Cl. 192—99)

This invention relates to a clutch and, more particularly, relates to a clutch of the type in which two rotary clutch members have mutually engageable teeth or shoulders, with one clutch member movable axially into and out of engagement with the other. The initial embodiment of the invention is employed for releasably connecting a flexible shaft to a motor-driven garbage disposer for deriving power therefrom. The description of this embodiment will provide adequate guidance for those skilled in the art who may have other specific applications for such a clutch.

The flexible shaft actuates a drive unit adjacent the sink that is adapted to power such kitchen devices as mixers, blenders, ice cream freezers, and the like. The flexible shaft extends downward from the level of the drive unit through the cabinet structure of the sink to the level of the lower end of the garbage disposer where the clutch of the present invention serves for releasably connecting the flexible shaft to the garbage disposer motor.

It is apparent that one requirement to be met by the invention is to provide a simple, reliable clutch that may be easily and conveniently operated by a housewife. In this regard a feature of the invention is that the clutch is operated by a simple foot pedal.

On some occasions when the powered kitchen devices are to be used frequently, the clutch at the lower end of the flexible shaft may remain engaged for many hours. On other occasions when the kitchen devices are idle, the clutch may remain disengaged for many hours. Another requirement, therefore, is that the foot-operated clutch have an inherent tendency to stay in engagement indefinitely once it is shifted into engagement, and have an inherent tendency to stay out of engagement indefinitely whenever it is disengaged.

Such a clutch should operate in a trouble-free manner over a long service period. It is well known, however, that where cooperating clutch members have teeth for releasable mutual engagement, too often the teeth break off to cause trouble. It has been found that this difficulty may be avoided by moving the clutch members into mutual engagement in a rapid manner. Accordingly, a further feature of the invention is that when the foot pedal is shifted for actuation of the flexible shaft, the two clutch members move together with a snap action.

The clutch includes two releasably engageable rotary clutch members, one of which is retractable against spring pressure. A link with a cam slot in cooperation with a cam pin retracts the retractable clutch member, the cam action of the link being controlled by the foot pedal. The foot pedal shifts the link laterally between one position at which the link retracts the clutch member and an alternate position which permits a spring to return the clutch member to its engagement position with a snap action.

The force of the spring acting on the cam slot and cam pin provides the required inherent tendency for the clutch to stay engaged once the clutch is shifted into engagement. The required tendency for the disengaged clutch to remain disengaged is provided by making the cam slot angular so that the cam slot yieldingly seats the cam pin with a latching action when the clutch is disengaged in opposition to the clutch spring. Thus, the foot pedal that controls the clutch remains at either of its two alternate positions to which it may be shifted.

The various features and advantages of the invention may be understood by reference to the following detailed description and the accompanying drawings.

In the drawings, which are to be regarded as merely illustrative:

FIG. 1 is a side elevation of the present embodiment of the clutch with parts broken away to reveal concealed structure;

FIG. 2 is a side elevation of the clutch at 90° from FIG. 1;

FIG. 3 is a plan view of the clutch as seen along the line 3—3 of FIG. 2;

FIG. 4 is a longitudinal sectional view of the clutch;

FIG. 5 is a side elevational view of the slotted link and the associated foot pedal with the foot pedal elevated and the clutch disengaged;

FIG. 6 is a similar view with the clutch pedal depressed and the clutch engaged; and FIG. 7 is an exploded view of the two cooperating clutch members and the associated yoke for retracting the axially movable clutch member.

*General Arrangement*

Referring first to FIGS. 1, 4, and 7, the principal parts of the selected embodiment of the invention include: an upper rotary clutch element 10 adapted for direct connection to a garbage disposer motor 12 in FIG. 1, the clutch element having shoulders formed by clutch teeth 14 (FIG. 7); a shaft means 15 for connection by a pair of pinion gears 16 and 18 with a flexible shaft 20 that is shown in phantom in FIG. 4; a lower rotary clutch element 22 that is slidingly keyed to the shaft means 15, the lower clutch element having shoulders formed by clutch teeth 23 and having an upwardly facing rim portion 24; a coil spring 25 that urges the lower clutch element 22 upward towards the upper rotary clutch element 10; a clutch yoke 26 which is shaped to engage the rim portion 24 of the lower clutch element 22 and is formed with a shank 28; a rocker arm 30 in the outer end of which the yoke shank 28 is journaled, the rocker arm being pivotally mounted on a stud 32; a link 34 pivotally connected at its upper end to the rocker arm 30, the link being formed with a cam slot 35 near its lower end in sliding engagement with a fixed cam pin 36; and a foot pedal 40 which is pivotally mounted on a stud 42 and straddles the lower end of the link 34 for swinging the lower end of the link between two alternate positions. As best shown in FIGS. 5 and 6, the cam slot 35 is of angular configuration to form a recess 44 to seat the fixed cam pin 36 in a releasable manner, the seat being separated from the rest of the slot by an upwardly tapered shoulder 45.

*Operation*

FIGS. 4 and 6 indicate the positions of the parts when the clutch is engaged. The foot pedal 40 is inclined downward to hold the lower end of the link 34 in its rightward position relative to the fixed cam pin 36 with the cam pin in the lower end of the cam slot 35. With the link 34 swung to this rightward position the coil spring 25 yieldingly holds the lower rotary clutch element 22 in positive engagement with the upper rotary clutch element 10 thereby operatively connecting the flexible shaft 20 to the motor 12.

When the foot pedal 40 is swung upward from the position shown in FIG. 6 to the position shown in FIG. 5, the lower rotary clutch element 22 is retracted downward out of operative engagement with the upper rotary clutch element 10. As may be seen by comparing FIGS. 5 and 6, swinging pedal 40 upward causes the foot pedal to shift the link 34 from its rightward position with respect to the fixed cam pin 36 to its leftward position. Since the cam slot 35 is inclined upward to the right, this leftward swinging movement of the link shifts the link longitudinally downward by the cam action of the lower edge of the cam slot on the fixed cam pin 36.

In the course of this leftward swing of the link 34 the tapered shoulder 45 passes under the fixed pin 36 so that the recess 44 formed at the upper end of the cam slot latches the link at its leftward position. The longitudinal downward shift of the link 34 pulls the rocker arm 30 downward and thereby pulls the yoke 26 downward against the rim 24 of the lower rotary clutch element 22 to push the lower rotary clutch element downward to its disengaged position in opposition to the spring 25.

If the outer end of the foot pedal 40 is now lowered to cause the tapered shoulder 45 of the cam slot 35 to pass the fixed cam pin 36, the link 34 will be moved upward with a snap action. It is this snap action in the movement of the lower rotary clutch element 22 into engagement with the upper rotary clutch element 10 that avoids breakage of the clutch teeth.

Structural Details

The working parts of the device are housed in a casing 46 together with a cylindrical connector 48 that anchors the casing to the garbage disposer motor 12. The casing 46 has the configuration of a right angle with an upwardly extending vertical leg and a laterally extending horizontal leg. The casing is made in two longitudinal halves which are releasably connected together by suitable screws 50. Attached to the lower end of the casing 46 by screws 52 is a threaded connector fitting 54 to which the tubular casing (not shown) of the flexible shaft 20 is connected in a well-known manner.

The upper end of the casing 46 is formed with a tapered flange 55 which mates with a complementary tapered flange 56 of the cylindrical connector 48. The casing 46 and the cylindrical connector 48 are held together by a split channel-shaped ring 46 which grips the two flanges 55 and 56, the split ring being made in two halves that are releasably interconnected by screws 60. The upper end of the cylindrical connector 48 is formed with a radial flange 62 which, as shown in FIG. 1, is connected to the garbage disposer motor 12 by suitable cap screws 64.

The upper rotary clutch element 10 is secured by a cross pin 65 to the reduced lower end of a short shaft member 68. The shaft member 68 is journaled in the cylindrical connector 48 by means of a lubricant-impregnated bearing sleeve 70. The upper end of the shaft member 68 is counterbored to receive a shaft connector 72 which is preferably made of nylon and is formed with a hexagonal socket 74 to receive the end of the shaft (not shown) of the motor 12. The nylon shaft connector 72 is secured to the shaft member 68 by a cross pin 75.

The shaft member 68 which is the drive member on one side of the clutch is secured against axial movement in the bearing sleeve 70 by a lower washer 76 that backs against the upper rotary clutch element 10 and by an upper washer 78 in cooperation with a snap ring 80.

The shaft means 15 that operatively connects the lower rotary clutch element 22 with the pinion 16 comprises a short metal shaft member 82 and a short hexagonal shaft member 84 on which the lower rotary clutch element 22 is slidingly mounted. The shaft member 82 which may be regarded as the driven member on the other side of the clutch is counterbored to receive the lower end of the hexagonal shaft member 84, the hexagonal shaft member being secured in the counterbore by a cross pin 85. The shaft member 82 is further counterbored to house the previously mentioned coil spring 85 that urges the lower rotary clutch element 22 upward. The pinion 16 is mounted on the lower reduced end of the shaft member 82 by means of a cross pin 86.

The shaft member 82 is journaled in a cylindrical body 88 by means of a lubricant-impregnated bearing sleeve 90. For anchorage, the cylindrical body 88 is formed with a central circumferential groove 92 for engagement by a complementary inner circumferential rib 94 of the casing 46 to secure the cylindrical body against axial movement. The upper end of the shaft member 82 is formed with a radial flange 95 to cooperate with a washer 96 that abuts the upper end of the cylindrical body 88 and the upper end of the bearing sleeve 90. A second washer 98 backs against the pinion 16 and abuts the lower ends of the two sleeves 98 and 90.

The second pinion 18 is secured by a cross pin 100 on a reduced end portion of a short shaft member 102. The shaft member 102 is counterbored to receive a shaft connector 104 that is secured thereto by a cross pin 106. Here again the shaft connector 104 is preferably made of nylon and is formed with a hexagonal socket to receive the end of the previously mentioned flexible shaft 20. The use of the nylon shaft connector 104 to connect the flexible shaft to the clutch and the use of the nylon shaft connector 72 to connect the clutch to the garbage disposer motor greatly reduces the noise and vibration in the driving of the flexible shaft by the garbage disposer motor.

The shaft member 102 is journaled in a cylindrical body 108 by means of a lubricant-impregnated bearing sleeve 110. The cylindrical body 108 is formed with a central circumferential groove 112 which interlocks with an inner circumferential rib 114 of the casing 46. One end of the shaft member 102 is formed with a radial flange 115 which cooperates with a washer 116 in abutment with one end of the cylindrical body 108 and one end of the bearing sleeve 110. A second washer 118 backs against the pinion 18 and abuts the other ends of the cylindrical body 108 and the bearing sleeve 110.

The shank 28 of the clutch yoke 26 extends through a slot 120 in the casing 46 and through a bore in the upper end of the link 34, the outer end of the shank being journaled in a bore 122 in the rocker arm 30. The parts are held in their assembled positions by snap ring 124.

The lower end of the link 34 is formed with a curved edge 125 for cooperation with the foot pedal 40. The foot pedal 40 is formed with a shoulder 126 that makes sliding contact with one side of the link 34 and is formed with a hook-shaped arm 108 that provides a second shoulder 130 for contact with the other side of the link. It may be seen by comparing FIGS. 5 and 6 that the foot pedal 40 cooperates with the curved edge 125 of the link. In FIG. 5 the shoulder 130 engages the curved edge 125 with the shoulder 126 engaging the adjacent straight side edge 132 of the link. In FIG. 6 the shoulder 126 is near the juncture of the curved edge 125 with the straight side edge 132 and the second shoulder 130 of the foot pedal is in contact with the second straight side edge 134 of the link 34.

My description in detail of the selected embodiment of the invention will suggest various changes, substitutions, and other departures from my disclosure within the spirit and scope of the appended claims.

I claim:

1. In a clutch wherein a first clutch element and a coaxial clutch element have shoulders for mutual positive driving engagement and said second clutch element is retractable axially out of engagement with the first clutch element in opposition to a compressively loaded clutch spring; operating means to control said second clutch element, said operating means comprising: means positioned to abut a portion of said second clutch element; a fixed cam pin; a link operatively connected with said abutting means and having a cam surface in sliding engagement with said cam pin, said link being laterally movable to shift said cam surface relative to said cam pin between one position permitting the spring to hold the second clutch element in engagement with the first clutch element and a second position retracting the second clutch element in opposition to the spring, said cam surface being formed with a shoulder to cooperate with said cam pin to yieldingly hold the link at its second position under the biasing action of said spring, the swinging end of said link having a curved surface; and an operating member having two portions in sliding contact with opposite sides of the swinging end of said link, said operating member being mounted on a pivot and having a handle for manual rotation about the pivot to swing the link between its two positions with one of said portions of the operating member positioned to slide along said curved surface of the link.

2. In a clutch for releasably connecting a rotary drive member with a rotary driven member wherein a first rotary clutch element is connected to one of said members, a shaft member positioned axially of said clutch element and connected to the other member, a second rotary clutch element slidably keyed to said shaft member for axial movement thereon into and out of positive engagement with the first clutch element, spring means continuously urging the second clutch element axially towards said first clutch element, and an operating element engaging said second clutch element to retract the second clutch element in opposition to said spring means, means to control said operating element, said control means comprising: a fixed cam pin; a rocker arm connected to said operating element; a link pivoted at one end to said rocker arm and swingable at its other end, said link having a slot at said other end in acute angular relation with the longitudinal axis of the link, said slot providing a cam surface in sliding engagement with said cam pin, said cam slot being arranged to cooperate with the cam pin for longitudinal movement of the link and consequent movement of said operating element in opposition to said spring when the link is swung from a first position to a second position, and vice versa, and a control member operatively connected with said link, said control member being mounted on a pivot and having a handle for manual rotation about its pivot to swing the link between its two positions.

3. A combination as set forth in claim 2 in which said control member straddles said link in sliding contact with opposite edges of the link.

4. Means for releasably clutching a flexible shaft to a motor at the lower end of a garbage disposer for deriving operating power therefrom, comprising: an L-shape casing having an upwardly extending vertical leg for connection to the bottom of the garbage disposer and a laterally extending horizontal leg to receive the end of the flexible shaft; a pair of gear engaged pinions in the joining portion of the legs of said casing; means in the horizontal leg of the casing for operatively connecting one of said pair of pinions with the flexible shaft; a first rotary clutch element in said vertical leg operatively connected with said motor; a shaft member in said vertical leg for driving the other of said pair of pinions; a second rotary clutch element slidingly keyed to said shaft member below said first clutch element for axial movement into and out of positive engagement with said first clutch element; a compressively loaded coil spring surrounding said shaft member to urge said second clutch element upward; means abutting a portion of said second clutch element; a cam pin fixedly mounted on said casing; a link pivotally connected at its upper end to said abutting means, said link having near its lower end a transverse cam surface in sliding engagement with said cam pin whereby swinging movement of the link in one generally lateral direction causes the cam pin to shift the link downward in opposition to said coil spring to retract the second clutch element out of engagement with the first clutch element and swinging movement of the link in the opposite direction releases said second clutch element for return upward movement by said spring; and a foot pedal operatively connected to said link, said foot pedal being pivotally mounted on the casing and extending from the casing.

References Cited in the file of this patent
UNITED STATES PATENTS

| | | |
|---|---|---|
| 1,203,425 | Spedden | Oct. 31, 1916 |
| 1,414,430 | Mammen | May 22, 1922 |
| 1,568,390 | Woodrow | Jan. 5, 1926 |
| 1,670,154 | Holmes | May 15, 1928 |
| 1,677,327 | Bradley | July 17, 1928 |
| 1,936,626 | Hodgkins | Nov. 28, 1933 |
| 2,658,396 | Christiance | Nov. 10, 1953 |